United States Patent Office 3,637,718
Patented Jan. 25, 1972

3,637,718
3-LOWER-ALKYL-6-HYDROXYFLAVANONES AND ESTERS THEREOF
Josef Krämer, Herbert Halpaap, and Karl-Otto Freisberg, Darmstadt, Germany, assignors to Merck Patent Gesellschaft mit beschränkter Haftung, Darmstadt, Germany
No Drawing. Filed June 21, 1968, Ser. No. 738,832
Int. Cl. C07d 7/24, 31/36
U.S. Cl. 260—295.5 B    23 Claims

ABSTRACT OF THE DISCLOSURE

Suitable for decreasing cholesterol levels, compounds of the following formula, esters and ester salts thereof:

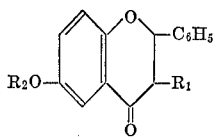

wherein
$R_1$ represents alkyl of 1–6 carbon atoms,
$R_2$ represents hydrogen, alkyl or 1–6 carbon atoms or Z-$(CH_2)_n$—,
Z is dialkylamino of 2–6 carbon atoms, pyrrolidino, piperidino or morpholino, and
$n$ is 2 or 3.

---

This invention relates to novel 3-alkyl-flavanones.

Various aspects of this invention embrace novel chemical compounds, processes for their production, and novel pharmaceutical compositions.

Upon further study of the specification and claims, other objects and advantages of the present invention will become apparent.

Thus, according to one aspect of the invention, there are provided 3-alkyl-flavanones, esters thereof, acid addition salts thereof, ester salts thereof and quaternary ammonium derivatives thereof. The 3-alkyl-flavanones are of the following Formula I:

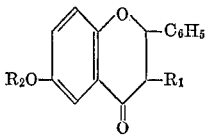

wherein
$R_1$ represents alkyl of 1–6 carbon atoms,
$R_2$ represents hydrogen, alkyl of 1–6 carbon atoms or Z—$(CH_2)_n$—,
Z is dialkylamino of 2–6 carbon atoms, pyrrolidino, piperidino or morpholino, and
$n$ is 2 or 3.

These compounds and the above-described derivatives thereof possess valuable pharmacological properties. In particular, they effect a decrease in the level of cholesterol in animals without, however, effecting a non-physiological enrichment of desmosterol or 7-dehydro-cholesterol in the sterols of the serum or of the liver as exhibited by conventional cholesterol-level-lowering agents, such as 22,25-diazacholesterol, triparanol and dehydroepiandrosterone-3-diethyl-aminoethyl ether. Furthermore, the novel 3-alkyl-flavanones exhibit estrogenic and antifertility activities.

More specifically, an oral dosage of 50 mg./kg. of the above-mentioned compounds resulted in the following percentage decreases in the cholesterol level of rats (test according to Counsell et al., J. Med. Pharm. Chem., 5, 720, 1224 [1962]):

|   | Percent |
|---|---|
| (A) Sodium salt of 3-methyl-6-hydroxyflavanone-6-sulfate | 86 |
| (B) 3-methyl-6-hydroxyflavanone | 42 |
| (C) 3-n-propyl-6-hydroxyflavanone | 37 |
| (D) 3-n-propyl-6-hydroxyflavanone - 6-nicotinate, cis-trans-mixture | 36 |

In addition, the compounds exhibit outstanding physiological compatibility, their toxicities being extraordinarily low. The $LD_{50}$ of compound (A), for example, is above 3.2 k./kg., and that of compound (D) is above 6.4 g./kg. (determined by oral administration to rats).

The compounds of Formula I can also be employed as intermediates for the preparation of other drugs.

To prepare the 3-alkyl-flavanones of Formula I, a ketone of the following Formula II, produced optionally in situ, is treated with cyclizing agents:

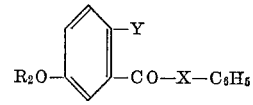

II wherein
X represents —$CR_1$=CH— or —$CHR_1$—CHY—;
Y represents OH, Cl, Br or I;
$R_1$ and $R_2$ have the previously indicated meanings; and wherein hydroxy groups can also be present in a functionally modified form.

Furthermore, in the thus-obtained product, a functionally modified hydroxy group can be optionally liberated by conventional treatment with hydrolyzing or hydrogenolyzing agents; and/or a free hydroxy group can be optionally esterified or alkylated in one or more stages, by treatment with esterifying or alkylating agents; and/or compounds of Formula I can be optionally converted by treatment with acids or bases or alkylating agents, respectively, into the physiologically compatible acid addition salts, ester salts, or quaternary ammonium compounds thereof.

Referring now to Formula I, examples of $R_1$ and $R_2$ defining alkyl groups include, but are not limited to: methyl, ethyl, propyl, isopropyl, n-butyl, sec.-butyl, isobutyl, tert.-butyl, n-amyl, isoamyl, n-hexyl and isohexyl.

When $R_2$ represents Z—$(CH_2)_n$, examples thereof include, but are not limited to: 2-dimethylaminoethyl, 2-diethylaminoethyl, 3-dimethylaminopropyl, 3-diethylaminopropyl, 2-pyrrolidinoethyl, 2-piperidinoethyl, 2-morpholinoethyl, 3-pyrrolidinopropyl, 3-piperidinopropyl and 3-morpholinopropyl.

When $R_2$ in Formula I represents H, suitable esters of such compounds include, but are not limited to lower acylates derived from carboxylic acids wherein the acyl group contains 1–6 carbon atoms, and also esters of mineral acids. In detail, typical esters include the formiates, acetates, propionates, butyrates, isobutyrates, valerates, isovalerates, trimethyl acetates, caproates, isocaproates, the nicotinates, isonicotinates, diethylamino acetates and the acid addition salts thereof, predominantly the hydrochlorides thereof. Of special importance, moreover, are the sulfuric acid esters and phosphoric acid esters and the physiologically compatible metal salts thereof, particularly the alkali metal (e.g. sodium) and ammonium salts, since these compounds, owing to their solubility in water, are readily administrable for therapeutic purposes.

The expression "ester salts" in the context of the present invention defines both acid addition salts of basic-substituted esters, e.g. nicotinates; and the metal and ammonium salts of acidic esters, e.g. sulfates.

Referring now to the details of how to make the compounds of Formula I, the preferred starting materials of Formula II are the chalcones.

The compounds of Formula II can be cyclized to the flavane derivatives of Formula I particularly by the effect of basic or acidic catalysts. Among the preferred catalysts are alkalis, such as sodium or potassium hydroxide, sodium amide, sodium hydride, basic-reacting salts, such as sodium or potassium acetate, sodium or potassium carbonate; buffer solutions, such as citric acid and disodium phosphate, sodium or potassium dihydrogen phosphate and borax or of boric acid, and sodium hydroxide and potassium chloride; organic bases, such as piperidine, pyridine, tetramethyl guanidine, benzyl trimethylammonium hydroxide; mineral acids, such as hydrochloric acid, hydrobromic acid, sulfuric acid, phosphoric acid, polyphosphoric acid; and organic sulfonic acids, such as toluenesulfonic acid or camphor sulfonic acid.

The cyclization can be conducted in the presence of an additional inert solvent, such as methanol, ethanol, dioxane, tetrahydrofuran, ethyl acetate, acetic acid, tetralin, benzene, toluene, and mixtures thereof or aqueous solutions thereof. It is also possible to employ an excess of the cyclization agent as the solvent. The cyclization is conducted at room temperature and can be accelerated by heating, if desired up to the boiling point of the solvent utilized. The reaction time is a few minutes up to a few days.

The chalcones are preferably obtained either by condensing benzaldehyde with a 2-hydroxyphenyl-alkyl ketone of Formula III substituted in the 5-position:

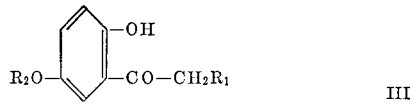

wherein $R_1$ and $R_2$ have the above-indicated meanings and hydroxy groups can also be present in a functionally modified form, or by reacting a p-substituted phenol and a cisnamic acid derivative in the presence of aluminum chloride.

It is unnecessary to isolate the chalcone to be employed as the starting material; rather, the reaction mixture of ketone III and benzaldehyde can be treated directly with the cyclization agent.

A particularly preferred process resides in treating a mixture of the ketose of Formula III and benzaldehyde with bases, such as NaOH, KOH or piperidine. In this connection, the base serves as the condensation agent during the chalcone formation, as well as the cyclization agent. The reaction can be conducted with or without an additional inert solvent. Preferred solvents are lower alcohols, such as methanol, ethanol, isopropanol or tert.-butanol. The reaction is preferably conducted by heating the reaction mixture to 30 to 150° C. for several hours. The molar ratios of ketone, benzaldehyde and base are preferably 1 mole of ketone, 1–2 moles of benzaldehyde and 0.1–100 moles of base.

Typical ketones of Formula III include, but are not limited to: 2,5-dihydroxyphenyl-ethyl ketone (-propiophenone), -propyl ketone (-butyrophenone), n-butyl ketone, -isobutyl ketone, -n-amyl ketone, -isoamyl ketone, -n-hexyl ketone, -isohexyl ketone, -n-heptyl ketone and -isoheptyl ketone, 2-hydroxy-5-methoxyphenyl-ethyl ketone, -propyl ketone, -n-butyl ketone and -isobutyl ketone, 2-hydroxy-5-ethoxyphenyl-ethyl ketone, -propyl ketone, -n-butyl ketone and -isobutyl ketone, 2-hydroxy-5-n-propoxyphenyl-ethyl ketone, -propyl ketone, -n-butyl ketone and -isobutyl ketone, 2-hydroxy-5-isopropoxyphenyl-ethyl ketone, -propyl ketone, -n-butyl ketone and -isobutyl ketone, 2-hydroxy-5-isobutoxyphenyl-ethyl ketone, -propyl ketone, -n-butyl ketone and -isobutyl ketone, 2-hydroxy-5-isoamyloxyphenyl-ethyl ketone, -propyl ketone, -n-butyl ketone and -isobutyl ketone.

In the above-described reaction of the compounds of Formulae II and III, respectively, it is possible for phenolic hydroxy groups to be present in a functionally modified form. Under the conditions, of the condensation reaction, such functionally modified hydroxy groups can be liberated. Thus, compounds wherein hydroxy groups are present in the protected form, such as in the form of a tetrahydropyranyl ether, can by cyclized in an acidic or alkaline medium; and in the case of an alkaline cyclization, the hydroxy group can be liberated by subsequent brief boiling with acid. Compounds wherein the hydroxy group is protected in the form of an ester can likewise be condensed in an acidic or alkaline medium; and the ester group can be simultaneously saponified.

Furthermore, suitable protective or blocking groups include ether groups, such as benzyl ether or methyl ether. Such ethers can be split, for example, by employing as the cyclization agent hydrobromic acid under those conditions where, as is known a splitting of phenol ether takes place.

Insofar as the thus-obtained cyclization product still contains functionally modified hydroxy groups, these can be liberated in accordance with conventional methods by treatment with hydrolyzing or hydrogenolyzing agents. Thus, it is possible, for example, to hydrolyze an esterified hydroxy group by treatment with basic or acidic agents. Preferred bases include aqueous, aqueous-alcoholic or alcoholic sodium or potassium hydroxide; and preferred acids include predominantly hydrochloric acid and sulfuric acid. Benzyl ethers are conveniently split by hydrogenolysis in the presence of noble metal catalysts, e.g. palladium-charcoal, thereby liberating the hydroxy group.

Conversely, it is also possible to esterify or alkylate a free hydroxy group. if desired. An esterification of hydroxy groups can be accomplished, for example, by heating with an anhydride or acyl halide of a carboxylic acid, of preferably 1–6 carbon atoms. Typical acids are acetic, propionic, butyric, isobutyric, valeric, isovaleric, caproic, nicotinic or isonicotinic acid. The esterification is advantageously conducted in the presence of a base, such as pyridine or of an alkali salt of the corresponding acid, or also in the presence of a small amount of a mineral acid, such as sulfuric acid or hydrochloric acid.

In order to product the sulfuric acid and phosphoric acid esters of the compounds of Formula I ($R_2$=H), the latter compounds are reacted in a conventional manner with sulfuric acid, phosphoric acid or a derivative of these acids suitable for esterification.

It is likewise possible to conduct the reaction with a sulfuric acid or phosphoric acid derivative wherein one or two hydroxy groups are blocked, and then in a subsequent step remove by hydrolysis or hydrogenolysis the protective groups present in the esters. Finally, the thus-obtained sulfuric acid or phosphoric acid esters can be converted into the physiologically compatible metal or ammonium salts thereof by treatment with bases.

An alkylation can be conducted, for example, by reaction with alkyl halides, alkyl sulfates or lower alkyl esters, the alkyl group of which is of 1–6 carbon atoms. In order to produce the dialkylaminoalkyl ethers, there are employed dialkylaminoalkyl halides, sulfates, or lower dialkylaminoalkyl esters, the dialkylaminoalkyl group of which contains 4–8 carbon atoms. The starting compounds are preferably reacted with methyl iodide, dimethyl sulfate, ethyl, propyl, isopropyl, butyl, isobutyl, amyl, isoamyl halides, 2-dimethylaminoethyl, 2-diethylaminoethyl, 2-(methylethylamino)-ethyl, 2-pyrrolidinoethyl, 2-piperidinoethyl, 2-morpholinoethyl, 3-dimethylaminopropyl, 3-diethylaminopropyl, 3-pyrrolidinopropyl, 3-piperidinopropyl or 3-morpholinopropyl halides, or also with the corresponding alcohols. Suitable halides include the chlorides, bromides and iodides.

Normally, the alkylation reaction is conducted in the presence of an alkali, such as sodium or potassium hydroxide or carbonate in the optional presence of a conventional inert solvent. The etherification reactions can be conducted, for example, in accordance with the conditions of a Williamson synthesis, the starting materials being the corresponding alkali phenolates. However, it is also possible to react the free phenols with the corresponding alcohols or substituted aminoalcohols in the presence of acidic catalysts, such as sulfuric acid, phosphoric acid, p-toluenesulfonic acid.

It is also possible to convert basic compounds of Formula I into the physiologically compatible acid addition salts thereof by treatment with acids. For this reaction, both organic and inorganic acids are suitable, e.g. aliphatic, alicyclic, araliphatic, aromatic or heterocyclic mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, isonicotinic acid, methane-sulfonic acid, naphthalene-mono- and -disulfonic acids, sulfuric acid, nitric acid, hydrohalic acids, such as hydrochloric acid or hydrobromic acid, or phosphoric acids, such as orthophosphoric acid.

Basic flavanes of Formula I can be converted into the physiologically compatible quaternary ammonium derivatives thereof by treatment with alkylating agents, preferably lower alkyl halides and sulfates, such as methyl iodide, dimethyl sulfate, ethyl bromide, ethyl iodide.

Of the compounds embraced by Formula I, subgeneric groups of compounds are preferred wherein:

(A) $R_1$ is methyl, ethyl, n-propyl, isopropyl, n-butyl, isobutyl, n-amyl, isoamyl, n-hexyl or isohexyl; and $R_2$ is the same as previously indicated;
(B) $R_1$ is defined as in (A) above; and $R_2$ is hydrogen;
(C) $R_1$ is defined as in (A) above; and $R_2$ is $R_7$—$(CH_2)_n$ wherein $R_7$ is dimethylamino, diethylamino, pyrrolidino, piperidino or morpholino; and $n$ is 2 or 3.

With respect to $R_7$—$(CH_2)_n$, it is preferred that $R_7$ be attached to $(CH_2)_n$ as follows: at the end of the chain.

Aside from the compounds embraced by subgeneric groups (A), (B) and (C), the esters, acid addition salts and quaternary ammonium compounds thereof are also preferred.

With respect to preferred species, reference is made to those already mentioned and those appearing in the examples. Additional preferred compounds are 3-methyl-6-methoxy-flavanone
3-ethyl-6-methoxy-flavanone
3-propyl-6-methoxy-flavanone
3-methyl-6-ethoxy-flavanone
3-ethyl-6-ethoxy-flavanone
3-propyl-6-ethoxy-flavanone
3-methyl-6-propoxy-flavanone
3-ethyl-6-propoxy-flavanone
3-propyl-6-propoxy-flavanone
3-methyl-6-isopropoxy-flavanone
3-ethyl-6-isopropoxy-flavanone
3-propyl-6-isopropoxy-flavanone
3-methyl-6-(2-dimethylamino-ethoxy)-flavanone
3-ethyl-6-(2-dimethylamino-ethoxy)-flavanone
3-propyl-6-(2-dimethylamino-ethoxy)-flavanone
3-methyl-6-(2-pyrrolidino-ethoxy)-flavanone
3-ethyl-6-(2-pyrrolidino-ethoxy)-flavanone
3-propyl-6-(2-pyrrolidino-ethoxy)-flavanone
3-ethyl-6-hydroxy-flavanone-6-sulfate and its Na salt
3-propyl-6-hydroxy-flavanone-6-sulfate and its Na salt
3-ethyl-6-hydroxy-flavanone-6-phosphate and its Na salt
3-propyl-6-hydroxy-flavanone-6-phosphate and its Na salt
3-ethyl-6-acetoxy-flavanone
3-propyl-6-acetoxy-flavanone
3-methyl-6-nicotinoyloxy-flavanone
3-ethyl-6-nicotinoyloxy-flavanone The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqueous solutions, as well as suspensions, emulsions, or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The compounds of this invention are generally administered to animals, e.g. mammals and avians. The dosage is a nontoxic amount for the treatment of hypercholesterolemia and the like, an amount sufficient to decrease the level of cholesterol, the preferred dosage range being about 0.01 to 10 mg. per kg. of body weight. Preferably a unit dosage contains about 1–500 mg. active compound of this invention and 1–5000 mg. of a pharmaceutically acceptable carrier.

As a pharmacological guide, the compounds of this invention can be used in a similar manner as the known compounds mentioned above with respect to cholesterol-level-lowering activity, as estrone or estradiol or their derivatives with respect to estrogenic activity, as 1-(2-[p-(3,4-dihydro-6-methoxy-2 - phenyl - 1 - naphthyl)-phenoxy]-ethyl)-pyrrolidine hydrochloride (cf. Emmens and Martin, J. Reprod. Fertil. 9, 269–275 (1965) with respect to antifertility activity.

The techniques for evaluating the estrogenic and antifertility activities are described by Allen and Doisy, J. Am. Med. Assoc. 81, 819 (1923) and by Emmens and Martin, respectively. For instance, in the Allen-Doisy-test, castrated female Wistar rats exhibited full estrus when treated with 30 mg./100 g. of the sodium salt of 3-methyl-6-hydroxy-flavanone-6-sulfate on nine consecutive days each.

The compounds of this invention can, furthermore, be used as intermediates for preparing certain 6,4'-disubstituted flavanones described in Belgian Pat. 652,404 by introducing an additional substituent in the 4'-position, by methods known as such.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE 1

(a) One gram of benbaldehyde and 1.6 g. of 2,5-dihydroxypropionphenone are boiled for 15 hours in 8 ml. of dry piperidine and 14 ml. absolute ethanol. The reaction mixture is stirred into ice water, acidified with hydrochloric acid and extracted with chloroform. The organic phase is washed with water, dried over sodium sulfate, and evaporated to dryness. 3 - methyl-6-hydroxyflavanone crystallizes from benzene, M.P. 174–176° C.

Analogously, the following compounds are obtained from the corresponding 2,5-dihydroxyphenylalkyl ketones:

3-ethyl-6-hydroxyflavanone, M.P. 147–149° C;
3-n-propyl-6-hydroxyflavanone, M.P. 145–146° C;
3-isopropyl-6-hydroxyflavanone;
3-n-butyl-6-hydroxyflavanone;
3-isobutyl-6-hydroxyflavanone;
3-n-amyl-6-hydroxyflavanone;
3-isoamyl-6-hydroxyflavanone;
3-n-hexyl-6-hydroxyflavanone;
3-isohexyl-6-hydroxyflavanone.

(b) A solution of 1 g. of 3-ethyl-6-hydroxyflavanone in 20 ml. of acetone is mixed with an ether solution of 5 g. of diethylaminoethyl chloride and 1 g. of anhydrous potassium carbonate, boiled for 20 hours, then stirred into water and extracted with chloroform. The extract is washed with water, dried over sodium sulfate and evaporated to dryness; the residue is dissolved in ethanol, and the solution is mixed with oxalic acid dissolved in ethanol. After allowing the reaction mixture to stand for a period of time, the oxalate of 3-ethyl-6-(2-diethylaminoethoxy)-flavanone crystallizes, M.P. 134–135° C.

Analogously, 3-methyl-6-(2-diethylaminoethoxy)flavanone is obtained, hydrochloride, M.P. 168–170° C.

(c) A solution of 1 g. of 3-methyl-6-hydroxyflavanone in 6 ml. of pyridine is mixed, at 90° C., with 1.1 g. of amidosulfonic acid and agitated for 3 hours at 90° C. Then, the mixture is cooled, washed with 30 ml. of ether, the pyridine phase is mixed with 17 ml. of 12% sodium hydroxide solution, as well as with 12 ml. of pyridine; then, the mixture is separated, again washed with ether, and concentrated by evaporation. From ethanol crystallizes the sodium salt of 3-methyl-6-hydroxyflavanone-6-sulfuric acid ester, M.P. 178–180° C.

(d) One gram of 3-n-propyl-6-hydroxyflavanone is heated for 30 minutes on a steam bath in a mixture of 5 ml. of dry pyridine and 5 ml. of nicotinic acid chloride. The reaction mixture is then poured into water, vacuum filtered, dried dissolved in a small amount of ethanol, and with ethereal hydrochloric acid there precipitates the hydrochloride of the nicotinic acid ester of 3-n-propyl-6-hydroxyflavanone, M.P. 168–170° C. The free base is obtained from the hydrochloride with sodium hydroxide solution and is separated, by fractional crystallization from methanol, into cis- (M.P. 131–133° C.) and trans- 3 - n - propyl-6-hydroxyflavanone-6-nicotinate (M.P. 90–92° C.).

(e) One gram of 3 - methyl - 6 - hydroxyflavanone is heated in 5 ml. of pyridine and 5 ml. of acetic anhydride for 5 hours to 50° C. After cooling, water and chloroform are added, the reaction mixture is separated, the chloroform layer is washed several times with water, and the chloroform is distilled off. 3-methyl-6-acetoxyflavanone is obtained, M.P. 127–129° C. (methanol).

(f) Under stirring, 7.5 g. of 3-methyl-6-hydroxyflavanone is dissolved at 5° C. within 15 minutes in a solution of 20 ml. of phosphorus oxychloride in 210 ml. of absolute pyridine, and added dropwise into 100 ml. of pyridine. The reaction mixture is allowed to stand overnight at room temperature, then poured on a mixture of ice and concentrated hydrochloric acid, and heated for 90 minutes in a steam bath. After cooling, the reaction mixture is extracted with ethyl acetate, the extracts are washed with dilute hydrochloric acid, dried over sodium sulfate, filtered, and the solvent is distilled off, thus obtaining 3-methyl-6-hydroxyflavanone-6-orthophosphate.

EXAMPLE 2

(a) One gram of α-benzylidene-2-hydroxy-5-(2-diethylaminoethoxy)-propiophenone, obtained by condensing 2-hydroxy - 5 - (2-diethylaminoethoxy)-propiophenone with benzaldehyde in an aqueous-methanolic sodium hydroxide solution at room temperature, is heated in 50 ml. of ethanol in the presence of 1 g. of p-toluenesulfonic acid for 2 hours at 130° C. in a bomb tube. Then, the reaction mixture is cooled, diluted solution of sodium hydroxide and chloroform are added, the mixture subjected to a separation step, the chloroform layer is dried over sodium sulfate, and evaporated to dryness. The residue is dissolved in ethanol and mixed with ethereal hydrochloric acid, thus obtaining 3-methyl-6-(2-diethylaminoethoxy)-flavanone hydrochloride, M.P. 168–170° C.

(b) 0.5 g. of the hydrochloride obtained in accordance with the above method is shaken with 2 ml. of dilute solution of sodium hydroxide and 10 ml. of ether; the layers are separated, the ether phase is dried over magnesium sulfate and mixed with an excess of methyl iodide. 3 - methyl - 6 - (2 - diethylaminoethoxy) - flavanone-methoiodide, precipitated after allowing the reaction mixture to stand for 24 hours, is filtered off.

EXAMPLE 3

One gram of 2-hydroxy - 5 - benzyloxy-propiophenone and 0.5 g. of benzaldehyde are dissolved in 10 ml. of ethanol, mixed with 5 g. of 50% potassium hydroxide solution, and shaken for 5 minutes. Then, the reaction solution is mixed with water, vacuum filtered, carefully washed with water, and thus 3-methyl-6-benzyloxyflavanone is obtained, which is hydrogenolyzed without any further purification in 40 ml. of ethyl acetate saturated with hydrogen chloride in 5% palladium charcoal at 35° C., until the stoichiometric amount of hydrogen has been absorbed. The catalyst is filtered off, the solvent is removed, and the thus-obtained 3-methyl-6-hydroxyflavanone is recrystallized from benzene, M.P. 174–176° C.

EXAMPLE 4

Analogously to Example 3, 2 g. of 2-hydroxy-5-(tetrahydropyranyl-2-oxy)-propiophenone is reacted with benzaldehyde, and the thus-obtained crude 3-methyl-6-(tetrahydropyranyl-2-oxy)-flavanone is boiled for 2 hours with 5% aqueous-ethanolic hydrochloric acid. The reaction mixture is stirred into water and worked up as in Example 1(a), obtaining 3-methyl-6-hydroxyflavanone, M.P. 174–176° C.

The following examples include suitable pharmaceutical compositions of the novel compounds which can be prepared according to conventional methods:

Example A.—Tablets

Each tablet contains:

| | Mg. |
|---|---|
| 3-methyl-6-hydroxy-flavanone | 2 |
| Lactose | 70 |
| Corn starch | 26 |
| Magnesium stearate | 2 |

Example B.—Coated tablets

Each tablet contains:

| | Mg. |
|---|---|
| 3-n-propyl-6-hydrodoxy-flavanone | 3 |
| Lactose | 80 |
| Potato starch | 15 |
| Talc | 2 |

The coating (150 mg.) is a conventional mixture of corn starch, sugar, talc, and tragacanth.

Example C.—Solution for injection

A solution of 2 kg. of the sodium salt of 3-methyl-6-hydroxy-flavanone-6-sulfate in 998 kg. of distilled water is prepared and filled into ampoules in such a manner that each ampoule contains 2 mg. of said sodium salt.

Example D.—Syrup

A mixture of

| | Kg. |
|---|---|
| 3-n-propyl-6-hydroxy-flavanone - 6 - nicotinate (cis-trans-mixture) | 0.2 |
| Glycerol (twice distilled) | 7.5 |
| Cane sugar | 56.0 |
| Methyl p-hydroxybenzoate | 0.07 |
| n-Propyl p-hydroxybenzoate | 0.03 |
| Ethanol | 10.0 |
| Fruit flavorings | As desired | is prepared and mixed with distilled water in such a manner that the volume of the entire preparation is 100 l. A dosage unit (5 ml.) contains 10 mg. of active substance.

Instead of the compounds mentioned other compounds covered by Formula I as well as their esters, salts of said esters, physiologically compatible acid addition salts and quaternary ammonium derivatives can be incorporated into similar compositions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A member of the group consisting of a compound of the formula:

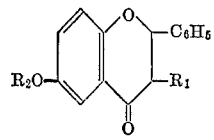

wherein $R_1$ is alkyl of 1–6 carbon atoms;
$R_2$ is H, alkyl of 1–6 carbon atoms or $Z—(CH_2)_n—$;
Z is dialkylamino of 2–6 carbon atoms;
$n$ is 2 or 3;

carboxylic and mineral acid esters thereof; salts of said esters; acid addition salts thereof; and quaternary ammonium compounds thereof.

2. A member as defined by claim 1, wherein $R_1$ is methyl, ethyl, n-propyl, isopropyl, n-butyl, isobutyl, n-amyl, isoamyl, n-hexyl or isohexyl.

3. A member as defined by claim 2, wherein $R_2$ is hydrogen.

4. A member as defined by claim 1, wherein $R_1$ is methyl.

5. A member as defined by claim 1, wherein $R_1$ is propyl.

6. A member as defined by claim 1, wherein said member is an alkali metal or ammonium ester salt.

7. A member as defined by claim 1, wherein said member is 3-methyl-6-hydroxy-flavanone.

8. A member as defined by claim 1, wherein said member is 3-ethyl-6-hydroxyflavanone.

9. A member as defined by claim 1, wherein said member is 3-n-propyl-6-hydroxyflavanone.

10. A member as defined by claim 1, wherein said member is the sodium salt of the sulfuric acid ester of 3-methyl-6-hydroxyflavanone.

11. A member as defined by claim 1, wherein said member is 3-n-propyl-6-hydroxy-flavanone-6-nicotinate.

12. A member as defined by claim 1, wherein said member is said compound.

13. A member as defined by claim 1 wherein $R_2$ is H or alkyl of 1–6 carbon atoms.

14. A member as defined by claim 1 wherein $R_2$ is H.

15. A member as defined by claim 1, wherein $R_2$ is alkyl of 1–6 carbon atoms.

16. A member as defined by claim 1, wherein $R_2$ is $Z—(CH_2)_n$ wherein Z is dialkylamino of 2–6 carbon atoms and $n$ is 2 or 3.

17. A member as defined by claim 1, wherein $R_2$ is ethyl.

18. A member as defined by claim 1, wherein $R_1$ is n-butyl.

19. A member as defined by claim 1, wherein $R_1$ is isobutyl.

20. A member as defined by claim 1, wherein $R_1$ is n-amyl.

21. A member as defined by claim 1, wherein $R_1$ is isoamyl.

22. A member as defined by claim 1, wherein $R_1$ is n-hexyl.

23. A member as defined by claim 1, wherein $R_1$ is isohexyl.

References Cited

Row et al., Current Science, No. 12, pp. 393–4 (1956).

JOHN M. FORD, Primary Examiner

U.S. Cl. X.R.

260—294.7 D, 247.7 G, 247.7 A, 294.7 J, 295 F, 240 D, 326.5 D; 424—283, 266